Patented May 22, 1934

1,960,211

UNITED STATES PATENT OFFICE 1,960,211

PREPARATION OF ADIPIC ACIDS

Ralph P. Perkins and Andrew J. Dietzler, Midland, Mich., assignors to The Dow Chemical Company, Midland, Mich., a corporation of Michigan No Drawing. Application November 3, 1932, Serial No. 641,123

12 Claims. (Cl. 260—112)

This invention relates to methods of preparing adipic acid and beta-alkyl substituted adipic acids, and also includes a new compound, viz., beta-tertiary-butyl adipic acid.

The production of adipic acid and the beta-alkyl substituted derivatives thereof is ordinarily accomplished by the oxidation with nitric acid of cyclohexanol, cyclohexanone, or the 3- and 4-alkyl substituted derivatives thereof, e. g. 3- and 4-methyl cyclohexanol, 4-tertiary-butyl cyclohexanol, etc. However, in carrying out the oxidation it has been found that the temperature of the nitric acid should be maintained at or near its boiling point, since it is desirable that the oxidation of the alcohol or ketone should set in as soon as the first drop thereof is added to the acid. If any considerable amount of the alcohol is added before the oxidation starts, or should accumulate during the reaction, a serious explosion may result. In view of the foregoing it has been proposed to incorporate into the nitric acid a catalyst capable of smoothing out the oxidation, and to permit the oxidation to be carried out at a relatively low temperature, e. g. 50°-60° C. For instance, British Patent No. 265,959 of 8 December 1927 discloses the use of mercury, molybdenum and vanadium compounds to promote the oxidation in the directions of increased yield and lowered reaction temperature.

We have determined that certain other catalysts can be incorporated with the nitric acid to cause the oxidation to proceed rapidly and smoothly, and to lessen the risk of accumulation of the alcohol or ketone in the reaction mixture with subsequent violent reaction. We have now found that sulphuric acid can be added to the nitric acid containing such catalysts, either before or during the reaction, to raise the yield of adipic acid in a marked degree, and to permit the use of less nitric acid. We have also found that the use of copper as a catalyst exercises a more beneficial effect upon the product yield than any other catalyst which has been previously disclosed, and that the use of copper as a catalyst is particularly desirable since when used in suitable amounts it is readily separable from the reaction product.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

The general conditions under which we prefer to carry out the oxidation of the cyclohexanol or similar starting material are as follows:—The cyclohexanol is poured slowly into nitric acid having a density between about 32° and about 43° Baumé. The amount of nitric acid used is preferably to be in the ratio of between about 2 and about 4 moles thereof per mole of cyclohexanol oxidized. During the addition of the cyclohexanol to the nitric acid the reaction mixture is agitated thoroughly and the temperature thereof is maintained by cooling at or near the lowest point at which the oxidation will proceed smoothly, usually in the range between about 35° and about 70° C. As a catalyst we may incorporate with the nitric acid before adding the cyclohexanol thereto one or more of the metals cerium, manganese, lead, iron, chromium, cobalt, nickel, tungsten, tellurium, bismuth, calcium, magnesium, uranium, barium, silver, molybdenum, vanadium, mercury, copper, or compounds thereof which are soluble in nitric acid, and in particular the oxides, sulphates, or nitrates thereof. The amount of catalyst which we may employ is relatively small, being between about 0.05 per cent and about 5.0 per cent, preferably about 0.3 per cent, by weight, based on the quantity of cyclohexanol to be oxidized.

Concentrated sulphuric acid is employed to improve the product yield and to decrease the amount of nitric acid required. The addition of such sulphuric acid to the nitric acid may be made before beginning the introduction of the cyclohexanol thereinto. However, we prefer to add the sulphuric acid to the reaction mixture after about one-half of the cyclohexanol has been introduced into the nitric acid, simultaneously with, and at about the same rate as the remainder of the cyclohexanol. The amount of sulphuric acid to be used is preferably in the ratio of between about 0.20 and 1.35 moles thereof per mole of the cyclohexanol oxidized. Instead of sulphuric acid we may use an equivalent amount of an acid sulphate, e. g. sodium acid sulphate (NaHSO₄).

The following examples show in detail the manner of carrying out our improved method for the preparation of adipic acid and the beta-alkyl substituted derivatives thereof, and illustrate the results obtained thereby.

*Example 1—Adipic acid*

A solution of 3 grams of crystallized copper nitrate in 923 grams of 38° Baumé nitric acid was prepared. To this solution was added, over a period of 76 minutes, 300 grams of cyclohexanol. During the addition of the cyclohexanol, the nitric acid solution was cooled to maintain it at a temperature of 60°–70° C. and thoroughly agitated. The cooling was then discontinued, and the mixture agitated 20 minutes more during which period the temperature rose to 80° C. The solution was then cooled to 8° C. and the crystals thereby precipitated were filtered from the mother liquor, washed and dried. The yield of substantially pure adipic acid crystals thus obtained was 330 grams or 75.4 per cent of the theoretical.

As a basis for judging the activity of the copper catalyst in the foregoing example, a comparable run was made without the use of the copper. This was less smooth, required a longer time to complete, and the yield of adipic acid obtained was 68.5 per cent of the theoretical.

Example 2—Adipic acid

A solution consisting of 710 grams of 43° Baumé nitric acid and 0.6 gram of crystallized copper nitrate was prepared. To this solution 300 grams of cyclohexanol was added at a uniform rate over a period of 130 minutes. When 150 grams of the cyclohexanol had been introduced into the nitric acid the addition of 275 grams of sulphuric acid was started and maintained at a rate such that the introduction into the reaction mixture of the remaining 150 grams of cyclohexanol and of the sulphuric acid was completed simultaneously. During the period of addition the reaction mixture was agitated and cooled to maintain it at a temperature between 39° and 42° C. After the addition of the alcohol and sulphuric acid to the nitric acid had been completed, the temperature of the reaction mixture was allowed to rise to 60° C., with continued stirring, and after 45 minutes at that temperature the mixture was then cooled to 8° C. The yield of substantially pure adipic acid, obtained by separating the crystals thereof precipitated in the foregoing reaction mixture, was 377 grams or 86 per cent of the theoretical.

As a basis for judging the activity of the sulphuric acid in the foregoing example, a comparable run was made without the use of sulphuric acid in which the yield of adipic acid obtained was 77.0 per cent of the theoretical.

Example 3—Adipic acid from cyclohexanone

As an example of the results which may be obtained in the preparation of adipic acid from cyclohexanone and to illustrate the effect exercised by the sulphuric acid upon the amount of cyclohexanone which can be oxidized with a given quantity of nitric acid, we dissolved 0.6 gram of crystallized copper nitrate in 533 grams of 43° Baumé nitric acid, maintained the temperature of the solution at 65°–70° C. and slowly added 284 grams of cyclohexanone thereto. At this point oxidation practically ceased. During the addition of the latter half of the cyclohexanone 200 grams of concentrated sulphuric acid was added to the reaction mixture substantially in the manner described in Example 1. The yield of adipic acid was 311 grams or 73.5 per cent of the theoretical.

A second solution of 0.6 gram of copper nitrate in an equivalent amount of 38° Baumé nitric acid was prepared. The slow addition of cyclohexanone to the solution was then begun, but no sulphuric acid was used during the oxidation. It was found that only 263 grams of cyclohexanone, or 92.5 per cent as much as in the previous run, could be oxidized with the same amount of nitric acid as used before. The yield of adipic acid was 71 per cent of the theoretical.

Example 4—Beta-methyl adipic acid

A solution consisting of 268 grams of 43° Baumé nitric acid and 0.6 gram of crystallized copper nitrate was prepared. To this solution was added 114 grams of a mixture of 3- and 4-methyl cyclohexanol. The reaction mixture was agitated and cooled to maintain it at a temperature of 60°–70° C. during the addition of the alcohol. When 57 grams, i. e. one-half, of the alcohol had been added to the reaction mixture, the introduction of sulphuric acid was started and continued at such a rate that 92 grams of concentrated sulphuric acid was introduced into the reaction mixture simultaneously with the latter 57 grams of the alcohol. The period of addition was 110 minutes, at the conclusion of which the mixture was warmed over a period of 30 minutes to 90° C., maintained at that temperature for 30 minutes more, evaporated under reduced pressure to a volume of about 225 milliliters, and then cooled to a temperature of about 0° C. to precipitate crystals of beta-methyl adipic acid. The crystals were separated from the mother liquor and centrifuged, 110 grams, or 68.8 per cent of the theoretical yield, of crude beta-methyl adipic acid being obtained. Carrying out the foregoing reaction under similar conditions except that the catalyst and sulphuric acid were omitted, a yield of 96 grams of product was obtained, corresponding to 60.0 per cent of the theoretical yield.

Example 5—Beta-tertiary-butyl adipic acid

A solution consisting of 335 grams of 38° Baumé nitric acid and 1.0 gram of crystallized copper nitrate was prepared. To this solution was added in small portions over a period of 90 minutes 156 grams of 4-teritary-butyl cyclohexanol. The reaction mixture was agitated and maintained at a temperature of 55°–60° C. during the period of addition. After 89 grams of the alcohol had been added, 91 grams of concentrated sulphuric acid was added to the reaction mixture in one charge. Upon completion of the addition of the alcohol to the reaction mixture, the temperature thereof was raised to about 70° C. and maintained thereat for about 35 minutes. The mixture was then cooled to 8° C. to precipitate beta-tertiary-butyl adipic acid, the crystals of which were then separated therefrom by filtration, washed with water and dried. There was thus obtained 179 grams of crude tertiary-butyl adipic acid melting at 86°–90° C., a yield of 83.5 per cent of the theoretical. By repeated crystallization from dilute alcohol and nitric acid, beta-tertiary-butyl adipic acid melting at 115.2°–115.9° C. was obtained. The foregoing compound is a white crystalline substance slightly soluble in cold water, soluble in hot water and alcohol, which may be purified by crystallization from water, dilute alcohol, or nitric acid.

The present invention, then, as illustrated in the foregoing examples, comprehends oxidizing cyclohexanol, cyclohexanone, and the 3- and 4-alkylated derivatives thereof, to form adipic acid and the beta-alkyl substituted adipic acid. The conditions under which such oxidation is carried out comprise the addition of the alcohol or ketone to nitric acid having incorporated therein a catalyst capable of smoothing out the foregoing oxidation; and have regard for the employment of sulphuric acid, or its equivalent, in the reaction mixture whereby the yield of the desired product is markedly increased and the amount of nitric acid required is reduced. Among the catalysts hereinbefore recited we wish to note particularly copper, or the oxides or nitrates thereof, since copper compounds exert a more pronounced effect upon the yield of product obtained than any other catalyst we have employed, and, because when used in suitable amounts they remain dissolved in the mother liquor during crystallization of the product therefrom. This is a distinct advantage, resulting in a product uncontaminated by the catalyst, which result can not be realized when, for example, mercury compounds are employed.

Other modes of applying the principle of our invention may be employed instead of those explained, change being made as regards the method hereinafter disclosed, provided the step or steps stated by any of the following claims or the equivalent of such stated step or steps be employed.

We therefore particularly point out and distinctly claim as our invention:—

1. In the preparation of adipic acid and the beta-alkyl substituted derivatives thereof by the oxidation of a compound selected from the group consisting of cyclohexanol, cyclohexanone, and the 3- and 4-alkyl substituted derivatives thereof, with nitric acid, the step which consists in introducing sulphuric acid into the reaction mixture before the oxidation is completed.

2. In the preparation of adipic acid and the beta-alkyl substituted derivatives thereof by the oxidation of a compound selected from the group consisting of cyclohexanol, cyclohexanone, and the 3- and 4-alkyl substituted derivatives thereof with nitric acid having incorporated therewith a catalytic compound, the step which consists in introducing sulphuric acid into the reaction mixture before the oxidation is completed.

3. The method of preparing adipic acid and the beta-alkyl substituted derivatives thereof which comprises oxidizing a compound selected from the group consisting of cyclohexanol, cyclohexanone, and the 3- and 4-alkyl substituted derivatives thereof with nitric acid having incorporated therewith a catalyst and a compound from the class consisting of sulphuric acid and an acid sulphate.

4. The method of preparing adipic acid and the beta-alkyl substituted derivatives thereof which comprises oxidizing a compound selected from the group consisting of cyclohexanol, cyclohexanone, and the 3- and 4-alkyl substituted derivatives thereof with nitric acid having incorporated therewith a catalyst and sulphuric acid.

5. The method of preparing adipic acid which comprises oxidizing a compound from the class consisting of cyclohexanol and cyclohexanone with nitric acid having incorporated therewith a relatively small amount of a catalyst from the class consisting of copper, copper oxide, and salts of copper, in the presence of concentrated sulphuric acid.

6. The method of preparing adipic acid which comprises oxidizing a compound from the class consisting of cyclohexanol and cyclohexanone with nitric acid having incorporated therewith a relatively small amount of a catalyst from the class consisting of copper, copper oxide, and salts of copper and between about 0.20 and about 1.35 moles of concentrated sulphuric acid per one mole of compound to be oxidized.

7. The method of preparing adipic acid which comprises oxidizing a compound from the class consisting of cyclohexanol and cyclohexanone with nitric acid having incorporated therewith a relatively small amount of a catalyst from the class consisting of copper, copper oxide, and salts of copper and between about 0.20 and about 1.35 moles of concentrated sulphuric acid per one mole of compound to be oxidized, cooling the reaction mixture to precipitate adipic acid crystals therefrom and separating the crystals from the mother liquor.

8. The method of preparing adipic acid which comprises introducing a compound from the class consisting of cyclohexanol and cyclohexanone into between about 2 and about 4 moles of nitric acid of a density between about 32° and 43° Baumé per one mole of said compound, said acid having incorporated therewith between about 0.05 and about 5.0 per cent by weight based on the weight of said compound of a catalyst from the class consisting of copper, copper oxide, and salts of copper and between about 0.20 and about 1.35 moles of concentrated sulphuric acid per one mole of compound from the first named class, and maintaining the temperature of the reaction mixture in the range between about 35° and about 70° C. during the reaction.

9. The method of preparing adipic acid and the beta-alkyl substituted derivatives thereof which comprises oxidizing a compound selected from the group consisting of cyclohexanol, cyclohexanone, and the 3- and 4-alkyl substituted derivatives thereof with nitric acid having incorporated therewith a relatively small amount of a catalyst from the class consisting of copper, copper oxide, and salts of copper.

10. The preparation of beta-methyl adipic acid which comprises introducing a compound from the class consisting of 3- and 4-methyl cyclohexanol and 3- and 4-methyl cyclohexanone into nitric acid of a density between about 32° and about 43° Baumé having incorporated therewith a relatively small amount of a catalytic compound, simultaneously introducing into the reaction mixture between about 0.20 and about 1.35 moles of concentrated sulphuric acid per one mole of compound from the first named class while maintaining the reaction mixture at a temperature between about 35° and 70° C. and with agitation thereof, cooling the reaction mixture to precipitate beta-methyl adipic acid crystals therefrom, and separating the crystals from the mother liquor.

11. The method for the preparation of beta-tertiary-butyl adipic acid which comprises introducing 4-tertiary-butyl cyclohexanol into nitric acid of a density between about 32° and about 43° Baumé having incorporated therewith a relatively small amount of a catalytic compound, simultaneously introducing into the reaction mixture between about 0.20 and about 1.35 moles of concentrated sulphuric acid per one mole of 4-tertiary-butyl cyclohexanol while maintaining the reaction mixture at a temperature between about 35° and 70° C. and with agitation thereof, cooling the reaction mixture to precipitate beta-tertiary-butyl adipic acid crystals therefrom, and separating the crystals from the mother liquor.

12. Beta-tertiary-butyl adipic acid.

RALPH P. PERKINS.
ANDREW J. DIETZLER.